United States Patent
Choi et al.

(10) Patent No.: US 10,389,556 B2
(45) Date of Patent: Aug. 20, 2019

(54) APPARATUS AND METHOD FOR IDENTIFYING COMMUNICATIONS SIGNAL IN PRECEDING STAGE FOR COMMUNICATIONS MODEM

(71) Applicant: Samsung Electronics Co., Ltd., Suwon-si (KR)

(72) Inventors: Jae Hun Choi, Hwaseong-si (KR); Yoon Joong Oh, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/047,292

(22) Filed: Jul. 27, 2018

(65) Prior Publication Data
US 2019/0199561 A1    Jun. 27, 2019

(30) Foreign Application Priority Data
Dec. 21, 2017    (KR) .......................... 10-2017-0177148

(51) Int. Cl.
| | | |
|---|---|---|
| *H04L 1/20* | (2006.01) | |
| *H04L 27/00* | (2006.01) | |
| *H04L 29/06* | (2006.01) | |

(52) U.S. Cl.
CPC .......... *H04L 27/0002* (2013.01); *H04L 1/206* (2013.01); *H04L 27/0012* (2013.01); *H04L 69/24* (2013.01)

(58) Field of Classification Search
CPC ..... H04L 41/00; H04L 41/0681; H04L 27/00; H04L 1/206; H04L 27/0002; H04L 27/0012; H04L 29/06; H04L 1/20; H04L 61/2038; H04L 67/125; H04L 69/24; H04L 43/18; H04L 12/28; H04W 84/12; H04W 80/00; H04Q 11/0478
See application file for complete search history.

(56) References Cited

U.S. PATENT DOCUMENTS

| | | | |
|---|---|---|---|
| 7,055,752 B2 | 6/2006 | Yoshimoto et al. | |
| 8,629,763 B2 | 1/2014 | Hagl et al. | |
| 9,106,268 B2 | 8/2015 | Luong et al. | |

(Continued)

FOREIGN PATENT DOCUMENTS

| | | |
|---|---|---|
| JP | 2001-005922 A | 1/2001 |
| JP | 2010-183423 A | 8/2010 |

*Primary Examiner* — Rahel Guarino
(74) *Attorney, Agent, or Firm* — Muir Patent Law, PLLC

(57) ABSTRACT

An apparatus for identifying a communications signal in a preceding stage for a communications modem includes a communications signal identifying unit configured to receive a communications signal through a port, deliver data included in the communications signal to a communications modem, and sample the communications signal which has passed through the port during every unit length to detect a unit length pattern corresponding to a start of communication and a unit length pattern corresponding to an end of communication. When a length from the start of communication to the end of communication is equal to or smaller than a reference length, the communications signal identifying unit delivers a data process stopping signal to the communications modem such that the communications modem stops a data reading operation.

20 Claims, 8 Drawing Sheets

(56) References Cited

U.S. PATENT DOCUMENTS

| | | |
|---|---|---|
| 2008/0224873 A1 | 9/2008 | Yeo et al. |
| 2011/0206142 A1 | 8/2011 | Sung |
| 2013/0198470 A1* | 8/2013 | Horiguchi ............ G11C 16/26 711/162 |
| 2016/0086002 A1 | 3/2016 | Kang et al. |

* cited by examiner

APPARATUS AND METHOD FOR IDENTIFYING COMMUNICATIONS SIGNAL IN PRECEDING STAGE FOR COMMUNICATIONS MODEM

CROSS-REFERENCE TO RELATED APPLICATION

This application claims benefit of priority to Korean Patent Application No. 10-2017-0177148 filed on Dec. 21, 2017 in the Korean Intellectual Property Office, the disclosure of which is incorporated herein by reference in its entirety.

BACKGROUND

The present disclosure relates to an apparatus and method for identifying a communications signal in a preceding stage for a communications modem.

In general, communications devices may receive radio frequency (RF) signal through an antenna, perform analog processing (e.g., amplifying, filtering, frequency conversion, analog-to-digital conversion, etc.) on the received RF signal, and transmit the processed signal to a communications modem. The communications modem may digitally process the received signal to obtain information included in the RF signal.

However, communications devices may receive noise due to electromagnetic coupling of an antenna or electromagnetic disturbance (EMD), or cause noise due to an operation of an analog circuit. Such noise may cause a digital processing fault in the communications modem.

SUMMARY

An aspect of the present disclosure may provide an apparatus and method for identifying a communications signal in a preceding stage for a communications modem, capable determining whether a signal delivered to the communications modem is a communications signal or noise, and informing the communications modem about a determination result.

According to an aspect of the present disclosure, an apparatus for identifying a communications signal in a preceding stage for a communications modem may include a communications signal identifying unit configured to receive a communications signal through a port, deliver data included in the communications signal to a communications modem, and sample the communications signal which has passed through the port during every unit length to detect a unit length pattern corresponding to a start of communication and a unit length pattern corresponding to an end of communication. When a length from the start of communication to the end of communication is equal to or smaller than a reference length, the communications signal identifying unit delivers a data process stopping signal to the communications modem such that the communications modem stops a data reading operation.

According to another aspect of the present disclosure, an apparatus for identifying a communications signal in a preceding stage for a communications modem may include: a port for receiving a communications signal; and a communications signal identifying unit configured to receive the communications signal, deliver data included in the communications signal to a communications modem, and sample the communications signal which has passed through the port to detect a first pattern whose amplitude during a first length is greater than a predetermined amplitude and a second pattern whose amplitude during a second length longer than the first length is smaller than the predetermined amplitude. When a length from the first pattern to the second pattern is equal to or smaller than a reference length, the communications signal identifying unit delivers a data process stopping signal to the communications modem such that the communications modem stops a data reading operation.

According to another aspect of the present disclosure, a method for identifying a communications signal in a preceding stage for a communications modem may include: converting an analog communications signal into a digital communications signal; sampling the digital communications signal during every unit length to detect a unit length pattern corresponding to a start of communication; delivering the digital communications signal to a communications modem and counting a length of the digital communications signal after detecting the unit length pattern corresponding to the start of communication; sampling the digital communications signal during every unit length to detect a unit length pattern corresponding to an end of communication; and when a length from the start of communication to the end of communication is equal to or smaller than a reference length, initializing the communications modem.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
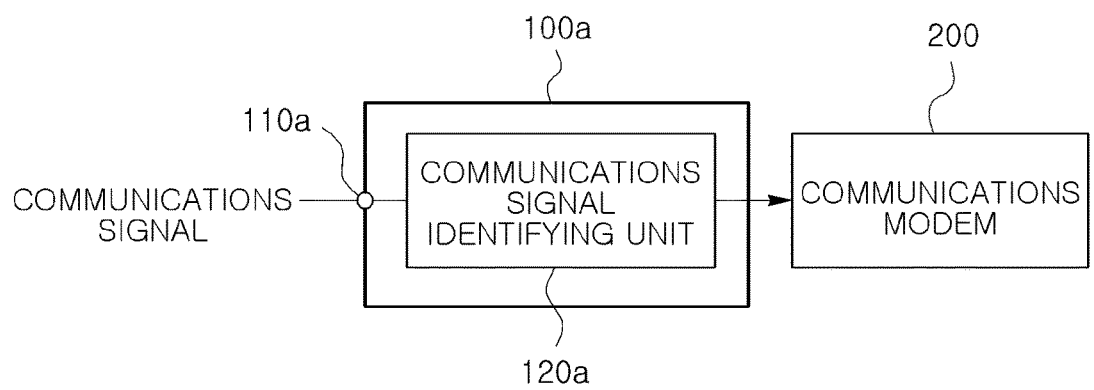
FIG. 1 is a block diagram illustrating an apparatus for identifying a communications signal in a preceding stage for a communications modem according to example embodiments.

FIG. 1 is a block diagram illustrating an apparatus for identifying a communications signal in a preceding stage for a communications modem according to example embodiments.

Referring to FIG. 1, an apparatus 100a for identifying a communications signal in a preceding stage for a communications modem 200 may include a port 110a and a communications signal identifying unit 120a.

The port 110a may receive a communications signal. For example, the port 110a may have a structure of an electrical connection structure (e.g., pin, pad, solder ball, land, etc.) which may be electrically connected to an RF IC or a baseband IC, may have input impedance corresponding to output impedance of the baseband IC, and may have a combination of a plurality of switches or a structure of a logic circuit to sequentially receive digital communications signals.

The communications signal identifying unit 120a may deliver data included in the communications signal to the communications modem 200. For example, the communications signal identifying unit 120a may perform analog-to-digital conversion on an analog communications signal and deliver the converted communications signal (i.e., digital communications signal) to the communications modem 200 to deliver the data to the communications modem 200. The communications signal identifying unit 120a may also sample the digital communications signal during each unit length in order to identify the information included in that corresponding unit of the digital communications signal. Here, the communications signal identifying unit 120a may deliver the data to the communications modem 200 by delivering the digital communications signal as is thereto.

The embodiments are described, and illustrated in the drawings, in terms of functional blocks, units and/or modules. These blocks, units and/or modules may be physically implemented by electronic (or optical) circuits such as logic circuits, discrete components, microprocessors, hard-wired circuits, memory elements, wiring connections, and the like, which may be formed together in a single integrated circuit (e.g., as a single semiconductor chip) or as separate integrated circuits and/or discrete components (e.g., several semiconductor chips wired together on a printed circuit board) using semiconductor fabrication techniques and/or other manufacturing technologies. These blocks, units and/or modules may be implemented by a processor (e.g., a microprocessor, a controller, a CPU, a GPU) or processors that are programmed using software (e.g., microcode) to perform various functions discussed herein. Each block, unit and/or module may be implemented by dedicated hardware, or as a combination of dedicated hardware to perform some functions and a processor to perform other functions. Also, each block, unit and/or module of the embodiments may be embodied by physically separate circuits and need not be formed as a single integrated.

The communications modem 200 may sequentially read the data included in the communications signal between a start of communication and an end of communication and acquire information corresponding to the data or perform an operation corresponding to the data.

If a unit length pattern corresponding to the start of communication is similar to a pattern based on noise, the communications modem 200 may perform an unnecessary data reading operation, and thus, the communications modem 200 may not be able to read the actual communications signal or may erroneously determine a reference timing at which to read the data of the communications signal. That is, the communications modem 200 may cause reception failure due to noise.

The frequency of reception failure of the communications modem 200 may be increased as a time difference between an input point of noise and an input point of the actual communications signal is shorter. That is, the communications modem 200 has time margin characteristics with respect to the time difference.

In example embodiments, the apparatus 100a for identifying a communications signal in a preceding stage for a communications modem may improve the time margin characteristics and prevent reception failure of the communications modem 200 when the time difference is short.

In detail, the communications signal identifying unit 120a may sample a signal which has passed through the port 110a during every unit length to detect a unit length pattern corresponding to the start of communication and a unit length pattern corresponding to the end of the communication. For example, the communications signal identifying unit 120a may include a sampling circuit for sampling a voltage or a current of the port 110a at predetermined intervals, and may detect an envelope, a peak value, or a frequency of the voltage or current of the port 110a.

Here, the unit length is a predetermined length of a unit or a segment of a digital communications signal, wherein the digital communications signal includes a plurality of units, or segments, each having the unit length, and each conveying information, such as control information (e.g., start of communication, end of communication, etc.) or data. For example, the unit length may be an integer multiple (e.g., 2 times, 4 times, 8 times, 16 times, 32 times, 64 times, 128 times, etc.) of fundamental wave periods (e.g., 73.74 ns (13.56 MHz), 83.3 ns (12 MHz), 62.5 ns (16 MHz), etc.), but is not limited thereto and may vary depending on a protocol. For example, in the case of a protocol of type A 106 Kbps according to the ISO 14443 standard in which the fundamental wave period of a communications signal is about 73.74 ns and the integral multiple is 128 times, the unit length may be about 9.44 us. Depending on a design, the protocol may be Type B or Type F of the ISO 15693 standard.

Thereafter, in the case where the length from the start of communication to the end of the communication is shorter than a reference length, the communications signal identifying unit 120a may transmit a data process stopping signal to the communications modem 200.

As an example, in response to the data process stopping signal, the communications modem 200 may stop the data reading operation and may be initialized to perform a data reading operation immediately thereafter. As another example, in response to the data process stopping signal, the communications modem 200 may disregard the data read in the length from the start of communication to the end of the communication equal to or shorter than the reference length. In this manner, the communications modem 200 may reduce the factors of reception failure due to noise and improve a reception success rate.

Figure 2:
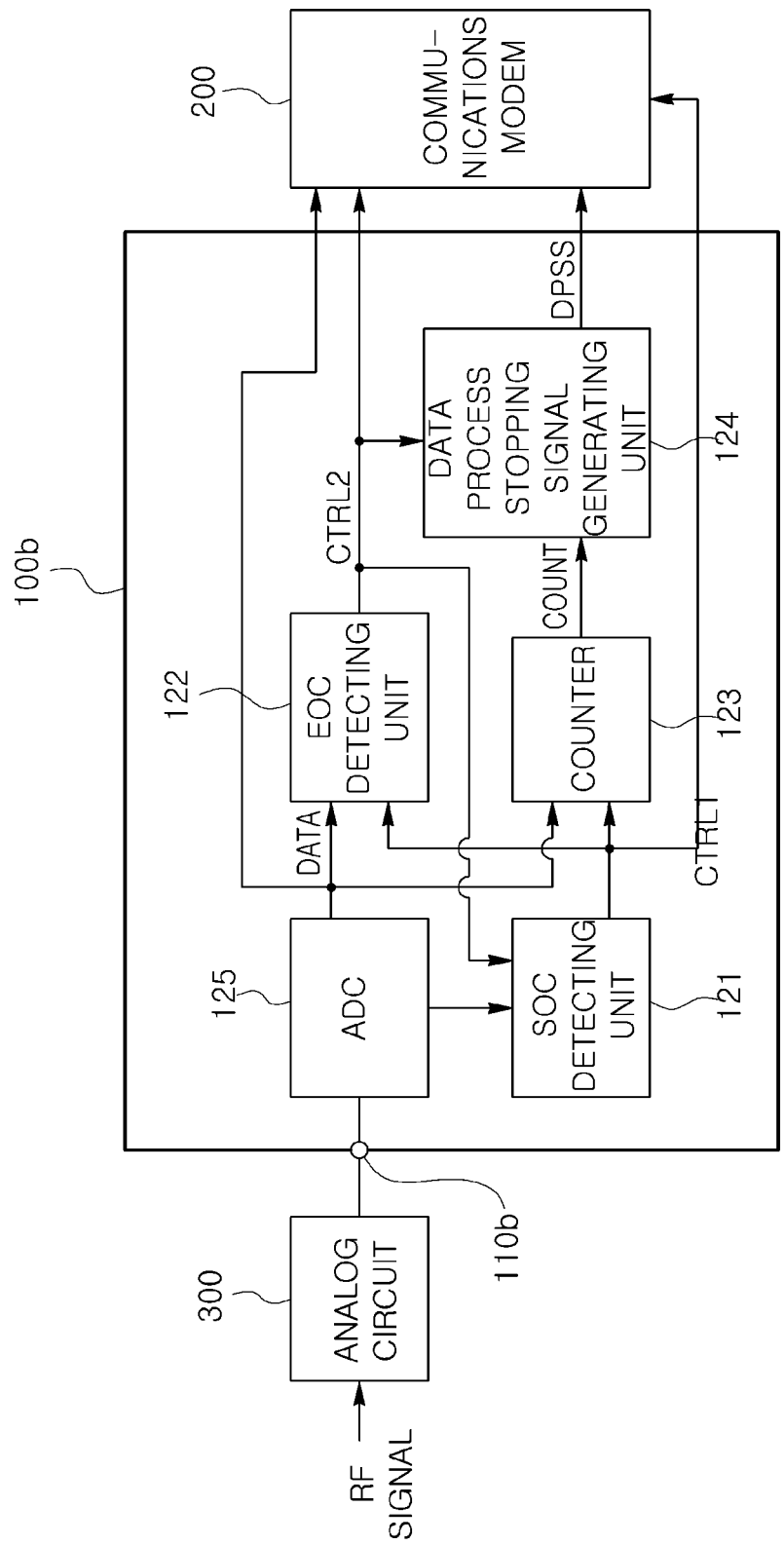
FIG. 2 is a block diagram illustrating components of a communications signal identifying unit of an apparatus for identifying a communications signal in a preceding stage for a communications modem according to example embodiments.

FIG. 2 is a block diagram illustrating components of the communications signal identifying unit of an apparatus for identifying a communications signal in a preceding stage for a communications modem according to example embodiments.

Referring to FIG. 2, a communications signal identifying unit of an apparatus 100b for identifying a communications signal in a preceding stage for a communications modem 200 may include at least some of a start of communication (SOC) detecting unit 121, an end of communication (EOC) detecting unit 122, a counter 123, a data process stopping signal generating unit 124, and an analog-to-digital converter 125.

The analog-to-digital converter 125 may perform analog-to-digital conversion on a communications signal of an analog circuit 300 transmitted through a port 110*b*. A digital communications signal converted by the analog-to-digital converter 125 may be delivered to the communications modem 200 and may be sampled by the SOC detecting unit 121 and the EOC detecting unit 122. The digital communications signal may have a signal length extending from the start of communication to the end of communication. For example, the digital communications signal includes a unit length pattern corresponding to the start of communication, a unit length pattern corresponding to the end of communication, a unit length pattern corresponding to 1 of the data, and a unit length pattern corresponding to 0 of the data.

The SOC detecting unit 121 may sense a unit length pattern corresponding to the start of communication and generate a start signal CTRL1. The SOC detecting unit 121 may transfer the start signal CTRL1 to the counter 123, the EOC detecting unit 122, and the communications modem 200. When the start signal CTRL1 is generated, the EOC detecting unit 122 and the counter 123 may be switched from an inactivated state to an activated state. In contrast, when the end signal CTRL2 is generated, the SOC detecting unit 121 and the counter 123 may be switched from an activated state to an inactivated state.

The EOC detecting unit 122 may sense a unit length pattern corresponding to the end of the communication and generate an end signal CTRL2. The EOC detecting unit 122 may transfer the end signal CTRL2 to the counter 123, the data process stopping signal generating unit 124, and the communications modem 200.

The counter 123 may count a length of data DATA included in the communications signal from a time point when the start signal CTRL1 is generated, and output a count value COUNT. For example, the counter 123 may increase the count value COUNT by 1 when a period of time corresponding to the unit length from a time point immediately after the unit length pattern corresponding to the start of communication has lapsed.

When the length corresponding to the count value COUNT is equal to or greater than the reference length, the counter 123 may stop counting, and when the end signal CTRL2 is generated or when the data process stopping signal generating unit 124 generates a data processing stopping signal DPSS, the counter 123 may initialize the count value COUNT.

The data process stopping signal generating unit 124 may receive the count value COUNT from the counter 123 until the end signal CTRL2 is generated, compare a length corresponding to the count value COUNT with the reference length, and generate a data processing stopping signal DPSS based on the comparison result.

The analog circuit 300 may include at least some of a matching network matched with an antenna, an attenuator attenuating an RF signal received by the antenna, a mixer converting a frequency of the RF signal into a baseband communications signal, a clock generator providing a clock signal to the mixer, a filter (e.g., a high-pass filter, a band pass filter, a low-pass filter, a notch filter) performing filtering on the communications signal, and a variable gain amplifier amplifying the communications signal with a gain determined to control an amplitude of the baseband communications signal. For example, the analog circuit 300 may be realized to perform near field communication (NFC) or remote communication (or long-distance communication). For example, the antenna may have a coil form corresponding to short-range communication or a conductor pattern form corresponding to long-distance communication.

The antenna may receive noise due to electromagnetic coupling or electromagnetic interference, and an operation of the variable gain amplifier may cause noise. The apparatus for identifying a communications signal in a preceding stage for a communications modem according to an exemplary embodiment in the present disclosure determines in a preceding stage for the communications modem 200 whether the signal transmitted to the communications modem 200 is a communications signal or noise and inform the communications modem about a determination result. Accordingly, the communications modem 200 may reduce a factor of reception failure due to noise and improve a reception success rate.

Figure 3:
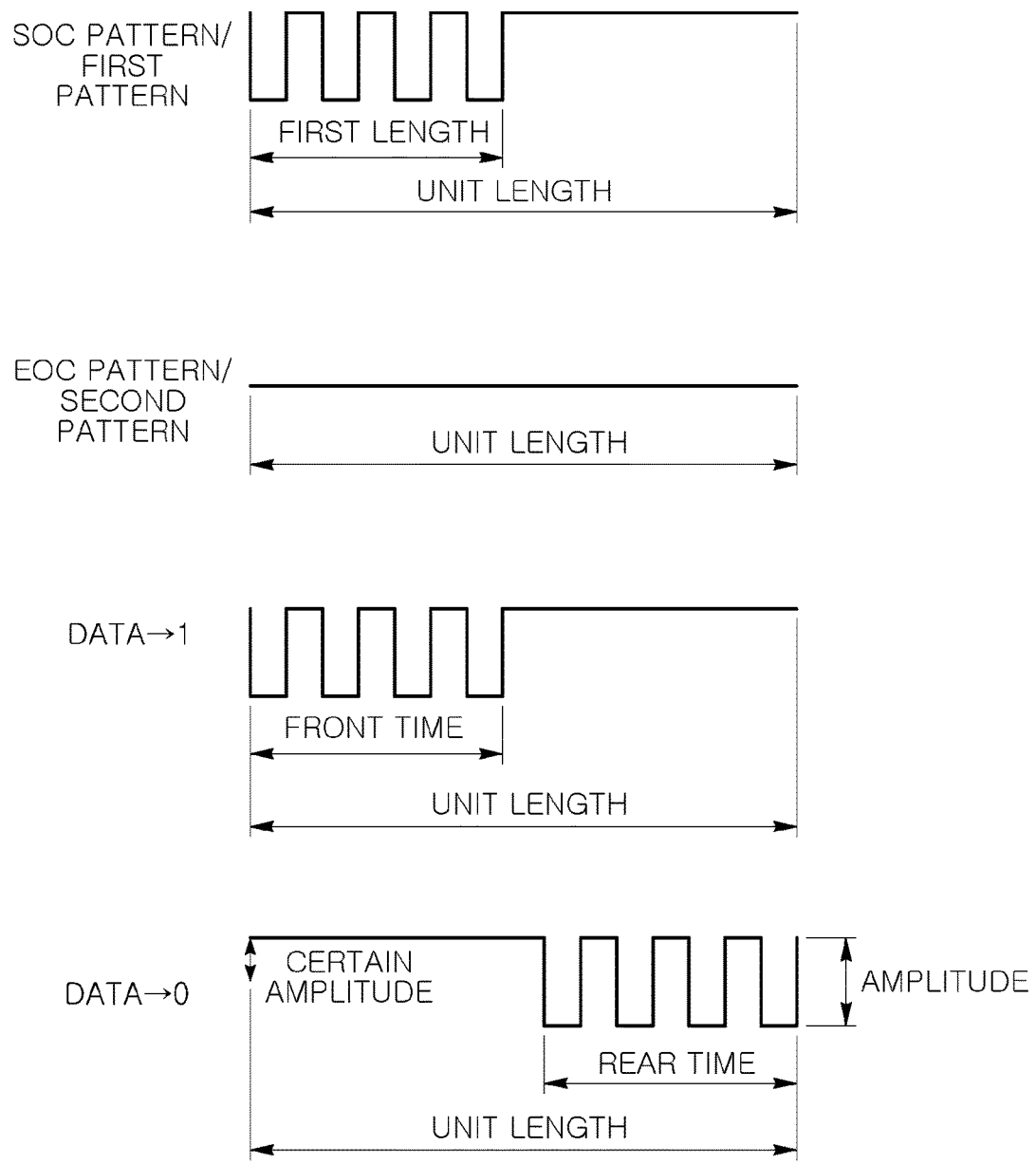
FIG. 3 is a view illustrating patterns of communications signals.

FIG. 3 is a view illustrating patterns of communications signals.

Referring to FIG. 3, a unit length pattern (SOC pattern) or a first pattern corresponding to the start of communication may be a pattern in which an amplitude (or, a maximum amplitude) is larger than a predetermined amplitude during a first length.

Referring to FIG. 3, a unit length pattern (EOC pattern) or a second pattern corresponding to the end of communication may be a pattern in which a maximum amplitude during a unit length or a second length is smaller than a predetermined amplitude. The unit length pattern corresponding to the end of communication may be an unmodulated signal.

Referring to FIG. 3, a pattern corresponding to 1 of data may be a pattern in which an amplitude (or, a maximum amplitude) of a front time is greater than an amplitude (or, a maximum amplitude) of a rear time during a unit length. That is, the unit length pattern (SOC pattern) corresponding to the start of communication or the first pattern may be substantially the same as the pattern corresponding to 1 of the data.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to data reading processes. The term "substantially" may be used herein to reflect this meaning. For example, items described as "substantially the same," "substantially equal," or "substantially planar," may be exactly the same, equal, or planar, or may be the same, equal, or planar within acceptable variations that may occur, for example, due to data reading processes.

Referring to FIG. 3, a pattern corresponding to 0 of data may be a pattern in which an amplitude of a front time is smaller than an amplitude of the rear time during a unit length.

The amplitude of the unit length pattern (SOC pattern) corresponding to the start of communication and the amplitude of the pattern corresponding to 0 of the data and the amplitude of the pattern corresponding to 1 of the data may substantially be equal to each other. In addition, a duty ratio of the unit length pattern corresponding to the start of communication, a duty ratio of the pattern corresponding to 0 of the data, and a duty ratio of the pattern corresponding to 1 of the data may substantially be equal to each other. Also, a frequency of the unit length pattern corresponding to the start of communication, a frequency of the pattern corresponding to 0 of the data, and a frequency of the pattern corresponding to 1 of the data may substantially be equal to each other. For example, the communications signal may be modulated by a simple method.

As a modulation scheme of the communications signal is simpler, the communications modem may more efficiently read data. However, as the modulation scheme of the communications signal is simpler, a pattern corresponding to noise may be recognized as the unit length pattern (SOC pattern) corresponding to the start of communication.

In example embodiments, although the modulation scheme of the communications signal is simple, the apparatus for identifying a communications signal in a preceding stage for a communications modem may reduce the frequency of reception failure in determining a pattern corresponding to noise as a unit length pattern (SOC pattern) corresponding to the start of communication. Thus, the apparatus for identifying a communications signal in a preceding stage for a communications modem may support the communications modem to reduce the frequency of reception failure, while efficiently reading data of the communications signal.

Figure 4:
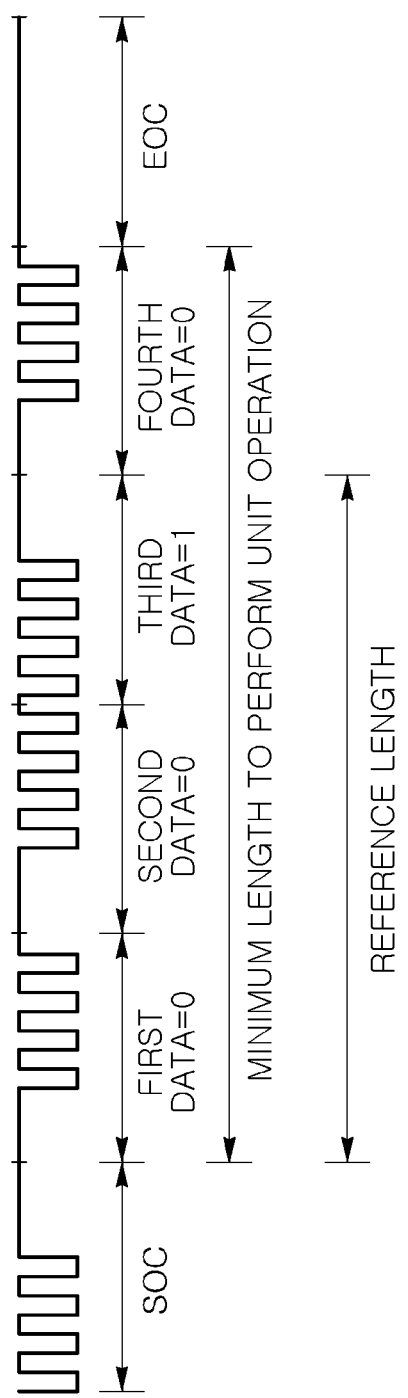
FIG. 4 is a view illustrating a combination of patterns of a communications signal.

FIG. 4 is a view illustrating a combination of patterns of a communications signal.

Referring to FIG. 4, the communications signal may have a structure in which the start of communication (SOC), first data, second data, third data, fourth data, and the end of communication (EOC) are sequentially connected.

In example embodiments, in the apparatus for identifying a communications signal in a preceding stage for the communications modem, if a length from the start of communication (SOC) to the end of communication (EOC) is equal to or smaller than a reference length, a data process stopping signal DPSS may be delivered to the communication modem. Here, the reference length may be shorter than a minimum length for the communications modem to process data included in the communications signal to perform a unit operation.

For example, the apparatus for identifying a communications signal in a preceding stage for the communications modem may set the reference length so that the communications modem does not omit information corresponding to the data or an operation corresponding to the data. For example, the minimum length may be at least four times the unit length and the reference length may be equal to or smaller than three times the unit length.

Figure 5:
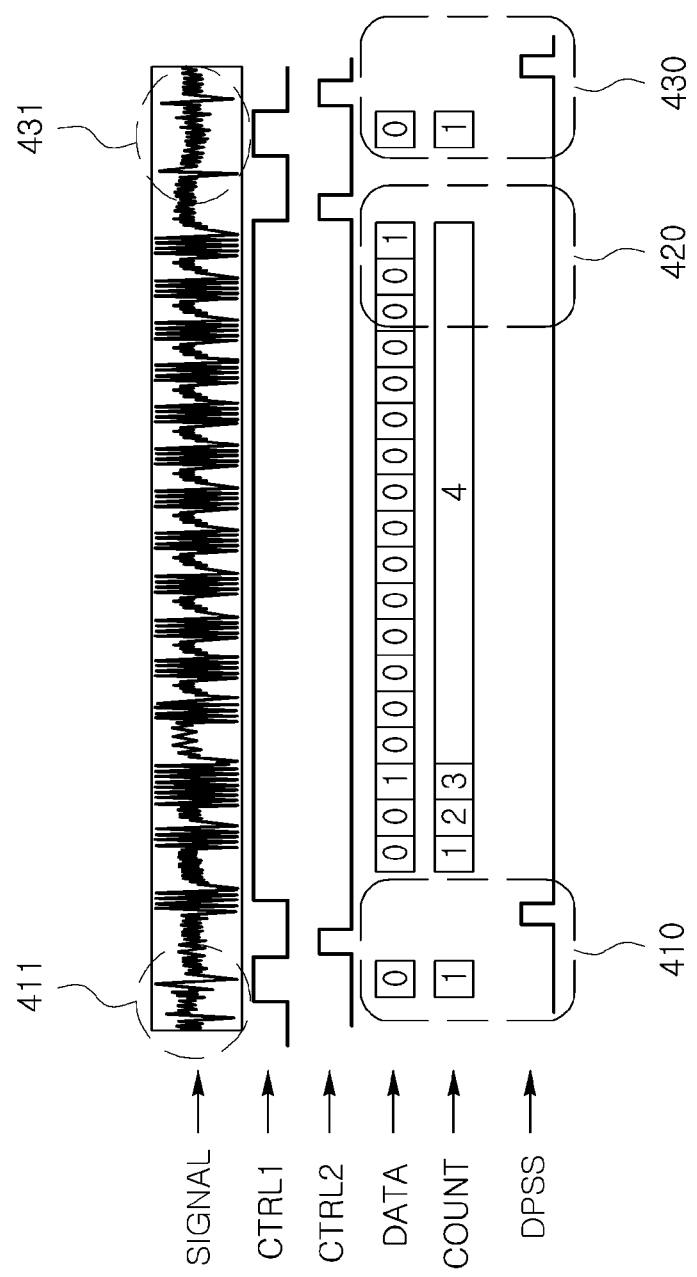
FIG. 5 is a view illustrating outputs of respective components of a communications signal identifying unit according to example embodiments.

FIG. 5 is a view illustrating outputs of respective components of the communications signal identifying unit according to example embodiments.

Referring to FIG. 5, a signal transmitted from a port may have first noise 411 during a first period 410. For example, the communications signal identifying unit may generate the start signal CTRL1 upon sensing the first noise 411. The data DATA may have the first data corresponding to 0 and the count value COUNT may be 1. Thereafter, the communications signal identifying unit may generate the end signal CTRL2 upon detecting the unit length pattern corresponding to the end of communication, and since the count value COUNT is 3 or less, the communications signal identifying unit may generate the data process stopping signal DPSS.

The signal delivered from the port may have a communications signal between the first period 410 and the second period 420. For example, upon detecting the unit length pattern corresponding to the start of communication, the communications signal identifying unit may generate the start signal CTRL1, and the data DATA may be sequentially transmitted to the communications modem. For example, the count value COUNT may be increased up to 4. Thereafter, upon sensing the unit length pattern corresponding to the end of communication, the communications signal identifying unit may generate the end signal CTRL2, and since the count value COUNT exceeds 3, the communications signal identifying unit may not generate the data process stopping signal DPSS.

Meanwhile, the signal transmitted from the port may have second noise 431 during a third period 430. If a period of time corresponding to a second length has not elapsed since the communications modem started to perform a data reading operation, the communications modem may not be able to prepare (for example, verifying read data, initialization, etc.) to perform a next data reading operation.

Therefore, when the second length from the unit length pattern corresponding to the end of communication to the unit length pattern corresponding to the start of second communication is equal to or smaller than the a reference length, the communications signal identifying unit may transmit a second data process stopping signal to the communications modem. Accordingly, the communications modem may further reduce a factor of reception failure due to noise and further improve the reception success rate.

Figure 6:
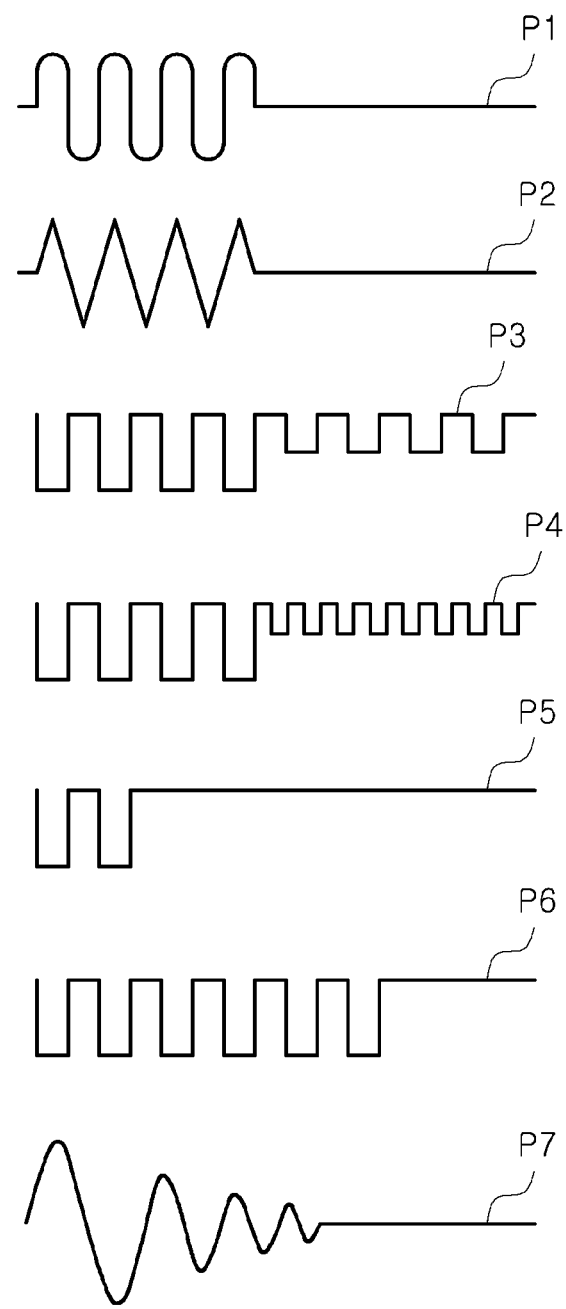
FIG. 6 is a view illustrating patterns of a communications signal.

FIG. 6 is a view illustrating patterns of a communications signal.

Referring to FIG. 6, patterns of the communications signal may be a sinusoidal pattern P1 or a triangular-wave pattern P2. A pattern of the communications signal may be a pattern P3 whose minimum amplitude is greater than 0 or a pattern P4 in which a frequency of the communications signal is variable. Also, a pattern of the communications signal may be a pattern P5 whose duty ratio is smaller than 50% or a pattern P6 whose duty ratio is larger than 50%.

Further, a pattern of the communications signal may be a pattern P 7 in which an amplitude gradually decreases. Accordingly, noise may have a possibility of being erroneously recognized as a pattern of the communications signal. However, the apparatus for identifying a communications signal in a preceding stage for a communications modem according to an exemplary embodiment in the present disclosure may reduce a factor of reception failure due to noise and improve the reception success rate although the communications signal having the pattern P7 whose amplitude gradually decreases.

Figure 7:
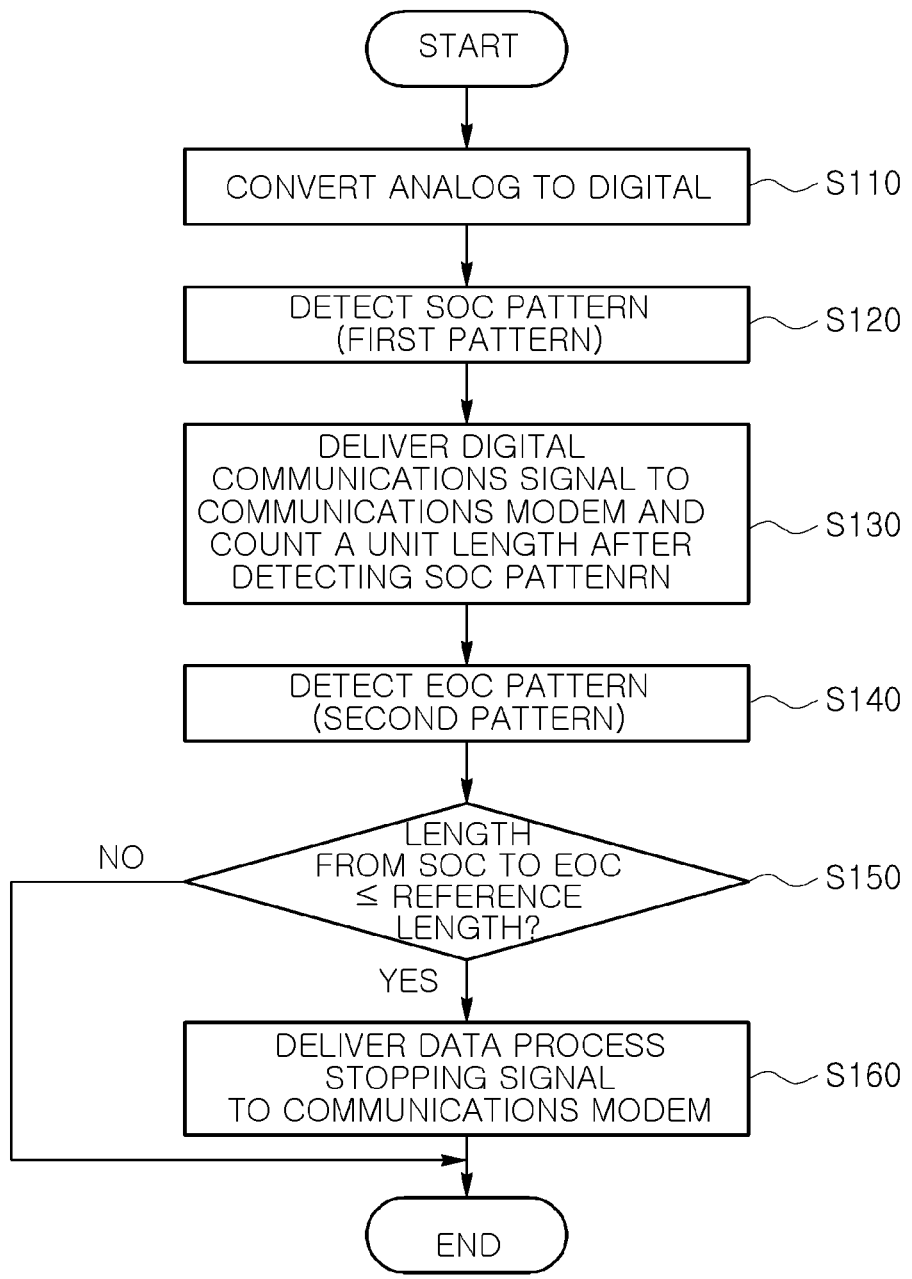
FIG. 7 is a flowchart illustrating a method of identifying a communications signal in front of a communications modem according to example embodiments.

FIG. 7 is a flowchart illustrating a method for identifying a communications signal in a preceding stage for a communications modem according to example embodiments.

Referring to FIG. 7, the method for identifying a communications signal in a preceding stage for a communications modem may include converting an analog communications signal into a digital communications signal (S110), sampling the digital communications signal during every unit length to detect a unit length pattern corresponding to the start of communication (S120), delivering the digital communications signal to a communications modem and counting a unit length of the digital communications signal after detecting the unit length pattern corresponding to the start of communication (S130), sampling the digital communications signal during every unit length to detect a unit length pattern corresponding to the end of communication (S140), determining whether a length from the start of communication to the end of communication is equal to or smaller than a reference length (S150), and when the length from the start of communication to the end of communication is equal to or smaller than the reference length, delivering a data process stopping signal to the communications modem (S160). In response to the data process stopping signal, the communications modem and the counter may be initialized. When the length from the start of communication to the end of communication is greater than the reference length, the data process stopping signal is not delivering to the communications modem.

For example, the unit length pattern corresponding to the start of communication may be replaced with the first pattern, and the unit length pattern corresponding to the end of communication may be replaced with the second pattern.

Figure 8:
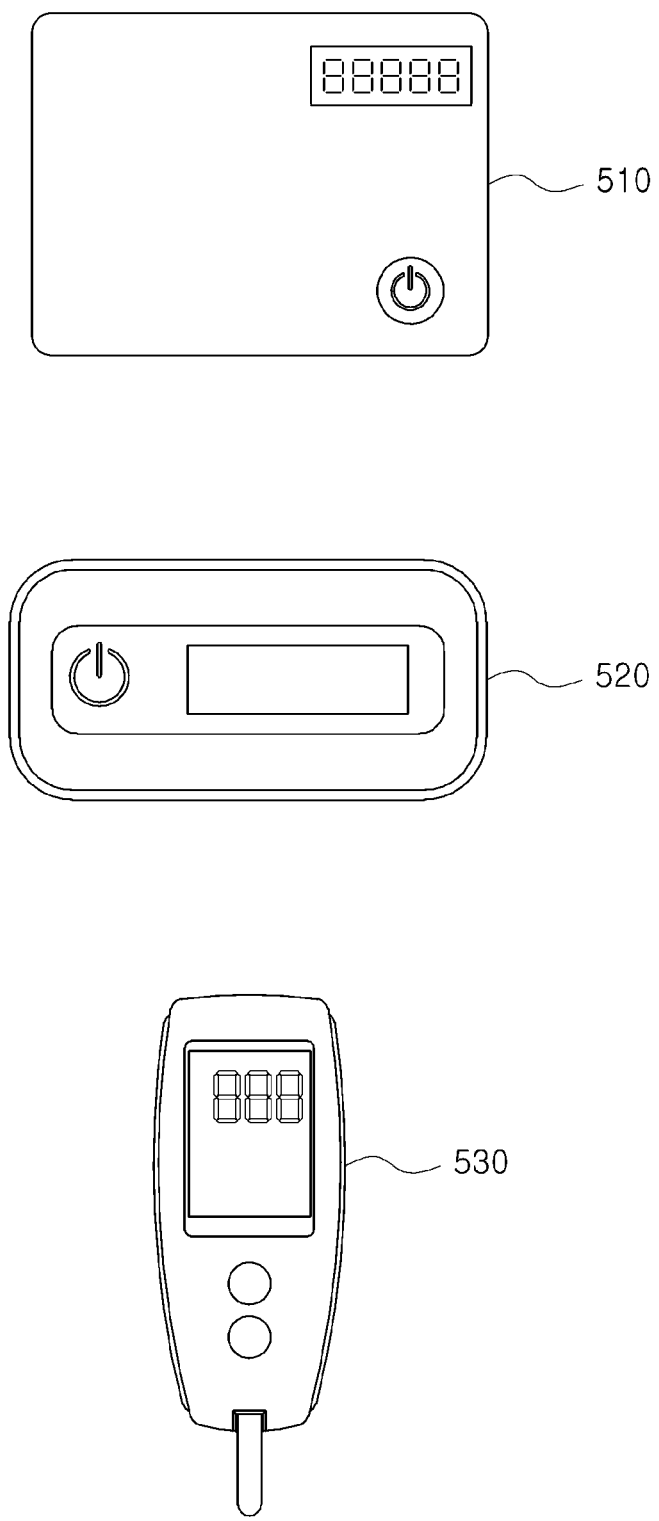
FIG. 8 is a diagram illustrating electronic devices which may include an apparatus for identifying a communications signal in a preceding stage for a communications modem according to certain embodiments.

FIG. 8 is a diagram illustrating an example of electronic devices that may include an apparatus for identifying a communications signal in a preceding stage for a communications modem according to certain embodiments.

Referring to FIG. 8, the apparatus for identifying a communications signal in a preceding stage for a communications modem disclosed herein may be included in a first electronic device 510, a second electronic device 520, or a third electronic device 530.

The first electronic device 510 may have a form of a card having a built-in communications device, the second electronic device 520 may have a form of a one time password (OTP) card having a built-in communications device, and the third device 530 may have a form of a measurement device having a built-in communications device. The apparatus for identifying a communications signal in a preceding stage for a communications modem disclosed above may be included in the communications device such as the first, second, and third electronic devices 510, 520, and 530.

The first, second and third electronic devices 510, 520, and 530 may perform short-range communication with respect to a communication target. If a user of the first, second, and third electronic devices 510, 520, and 530 puts the first, second and third electronic devices 510, 520, and 530 to be close to the communication target incompletely or rapidly, additional noise of the communications device may be generated.

The apparatus for identifying a communications signal in a preceding stage for a communications modem according to an exemplary embodiment in the present disclosure may reduce the frequency of reception failure of the communications modem in spite of the additional noise. Accordingly, the first, second, and third electronic devices 510, 520, and 530 may improve recognition performance with respect to the communication target.

Types of the electronic device are not limited thereto and may be realized as a smart phone, a personal digital assistant (PDA), a digital video camera, a digital still camera, a network system, a computer, a monitor, a tablet, a laptop, a netbook, a television, a video game machine, a smart watch, automotive, and the like.

The communications modem proposed in the present disclosure is not limited to the communications modem for performing short-range communication, and may be realized as a communications modem performing communication according to Wi-Fi (IEEE 802.11 family), WiMAX (IEEE 802.16 family, etc.), IEEE 802.20, long-term evolution (LTE), Ev-DO, HSPA+, HSDPA+, HSUPA+, EDGE, GSM, GPS, GPRS, CDMA, TDMA, DECT, Bluetooth, 3G, 4G, and any other wireless and wired protocols designated thereafter.

As set forth above, in the apparatus and method for identifying a communications signal at a preceding stage for a communications modem according to an exemplary embodiment in the present disclosure, whether a signal delivered to the communications modem is a communications signal or noise is determined in a preceding stage for the communications modem. Thus, the communications modem may reduce a factor of reception failure due to noise and improve a reception success rate.

While exemplary embodiments have been shown and described above, it will be apparent to those skilled in the art that modifications and variations could be made without departing from the scope of the present invention as defined by the appended claims.

What is claimed is:

1. An apparatus for identifying a communication signal in a preceding stage for a communication modem, the apparatus comprising:
   a communications signal identifying unit configured to receive the communication signal through a port, deliver data included in the communication signal to the communication modem, and sample the communication signal which has passed through the port during every unit length to detect a unit length pattern corresponding to a start of communication and a unit length pattern corresponding to an end of communication,
   wherein, when a length from the start of communication to the end of communication is equal to or smaller than a reference length, the communications signal identifying unit delivers a data process stopping signal to communication modem such that the communication modem stops a data reading operation.

2. The apparatus of claim 1, wherein the reference length is shorter than a minimum length for the communication modem to process the data included in the communication signal to perform a unit operation.

3. The apparatus of claim 2, wherein the minimum length is equal to or greater than four times the unit length, and
   wherein the reference length is equal to or less than 3 times the unit length.

4. The apparatus of claim 1, wherein when a second length from the unit length pattern corresponding to the end of communication to a unit length pattern corresponding to a start of second communication is smaller than a second reference length, the communications signal identifying unit delivers a second data process stopping signal to the communication modem such that the communication modem stops a data reading operation.

5. The apparatus of claim 1, wherein the communications signal identifying unit is configured to deliver at least a portion of the data included in the communication signal to the communication modem before receiving the data process stopping signal.

6. The apparatus of claim 1, wherein when the maximum amplitude during a unit length of the communication signal passing through the port is smaller than a predetermined amplitude, the communications signal identifying unit detects the end of communication.

7. The apparatus of claim 1, wherein when a pattern of the communication signal passing through the port during a unit length is substantially the same as a pattern corresponding to 0 or 1 of the data, the communications signal identifying unit detects the start of communication.

8. The apparatus of claim 1, wherein a pattern corresponding to 1 of the data is a pattern whose amplitude during a front time of a unit length is greater than an amplitude of a rear time thereof,
   wherein a pattern corresponding to 0 of the data is a pattern whose amplitude during the front time of the unit length is smaller than an amplitude of the rear time thereof, and
   wherein the communications signal identifying unit detects the start of communication when the pattern of the communication signal passing through the port during the unit length corresponds to the pattern corresponding to 1 of the data.

9. The apparatus of claim 1, wherein the maximum amplitude of the unit length pattern corresponding to the start of communication, the maximum amplitude of a pattern corresponding to 0 of the data, and the maximum amplitude of a pattern corresponding to 1 of the data are substantially the same,
- wherein a duty ratio of the unit length pattern corresponding to the start of communication, a duty ratio of the pattern corresponding to 0 of the data, and a duty ratio of the pattern corresponding to 1 of the data are substantially the same, and
- wherein a frequency of the unit length pattern corresponding to the start of communication, a frequency of the pattern corresponding to 0 of the data, and a frequency of the pattern corresponding to 1 of the data are substantially the same.

10. The apparatus of claim 1, wherein the communications signal identifying unit includes an analog-to-digital converter (ADC) configured to perform analog-to-digital conversion on the communication signal, and
- wherein the communications signal identifying unit is configured to sample a digital communication signal converted by the ADC.

11. The apparatus of claim 1, wherein the communications signal identifying unit includes:
- a start of communication (SOC) detecting unit configured to detect a unit length pattern corresponding to the start of communication and generate a start signal;
- an end of communication (EOC) detecting unit configured to detect a unit length pattern corresponding to the end of communication and generate an end signal;
- a counter configured to count a length of the data included in the communication signal from a time point when the start signal is generated; and
- a data process stopping signal generating unit configured to receive a count value from the counter until the end signal is generated, compare a length corresponding to the count value with the reference length, and generate the data process stopping signal based on the comparison result.

12. The apparatus of claim 11, wherein the EOC detecting unit and the counter are switched from an inactivated state to an activated state when the start signal is generated.

13. The apparatus of claim 11, wherein when the length corresponding to the count value is equal to or greater than the reference length, the counter is configured such that the counter stops counting, and
- wherein when the end signal or the data process stopping signal is generated, the counter is configured such that the counter initializes the count value.

14. An apparatus for identifying a communication signal in a preceding stage for a communication modem, the apparatus comprising:
- a port for receiving the communication signal; and
- a communications signal identifying unit configured to receive the communication signal, deliver data included in the communication signal to the communication modem, and sample the communication signal which has passed through the port to detect a first pattern whose amplitude during a first length is greater than a predetermined amplitude and a second pattern whose amplitude during a second length longer than the first length is smaller than the predetermined amplitude,
- wherein, when a length from the first pattern to the second pattern is equal to or smaller than a reference length, the communications signal identifying unit delivers a data process stopping signal to the communication modem such that the communication modem stops a data reading operation.

15. The apparatus of claim 14, wherein the reference length is shorter than a minimum length for the communication modem to process the data included in the communication signal to perform a unit operation.

16. The apparatus of claim 14, wherein the communications signal identifying unit is configured to deliver at least a portion of the data included in the communication signal to the communication modem before receiving the data process stopping signal.

17. The apparatus of claim 14, wherein the amplitude of the first pattern, an amplitude of a pattern corresponding to 0 of the data, and an amplitude of a pattern corresponding to 1 of the data are substantially the same,
- wherein a duty ratio of the first pattern, a duty ratio of the pattern corresponding to 0 of the data, and a duty ratio of the pattern corresponding to 1 of the data are substantially the same, and
- wherein a frequency of the first pattern, a frequency of the pattern corresponding to 0 of the data, and a frequency of the pattern corresponding to 1 of the data are substantially the same.

18. The apparatus of claim 14, wherein the communications signal identifying unit includes:
- a start of communication (SOC) detecting unit configured to detect the first pattern and generate a start signal;
- an end of communication (EOC) detecting unit configured to detect the second pattern and generate an end signal;
- a counter configured to count a length of the data included in the communication signal from a time point when the start signal is generated; and
- a data process stopping signal generating unit configured to receive a count value from the counter until the end signal is generated, compare a length corresponding to the count value with the reference length, and generate the data process stopping signal based on the comparison result.

19. A method for identifying a communication signal in a preceding stage for a communication modem, the method comprising:
- converting an analog communication signal into a digital communication signal;
- sampling the digital communication signal during every unit length to detect a unit length pattern corresponding to a start of communication;
- delivering the digital communication signal to the communication modem and counting a length of the digital communication signal after detecting the unit length pattern corresponding to the start of communication;
- sampling the digital communication signal at every unit length to detect a unit length pattern corresponding to an end of communication; and
- when a length from the start of communication to the end of communication is equal to or smaller than a reference length, initializing the communication modem.

20. The method of claim 19, wherein the reference length is shorter than a minimum length for the communication modem to process data included in the communication signal to perform a unit operation.

* * * * *